United States Patent
Kamp et al.

(10) Patent No.: US 9,390,610 B2
(45) Date of Patent: Jul. 12, 2016

(54) TECHNIQUES FOR DETERMINING MOVEMENT OF A DEVICE AWAY FROM A PREFERRED LOCATION

(71) Applicant: NCR Corporation, Duluth, GA (US)

(72) Inventors: Matthew Kamp, Cumming, GA (US); Gregory S. Egan, Flowery Branch, GA (US); Gregory Sirmans, Cumming, GA (US)

(73) Assignee: NCR Corporation, Duluth, GA (US)

( * ) Notice: Subject to any disclaimer, the term of this patent is extended or adjusted under 35 U.S.C. 154(b) by 55 days.

(21) Appl. No.: 14/338,702

(22) Filed: Jul. 23, 2014

(65) Prior Publication Data

US 2016/0027284 A1    Jan. 28, 2016

(51) Int. Cl.
    *G08B 21/00*       (2006.01)
    *G08B 21/18*       (2006.01)
    *G06Q 20/20*       (2012.01)
    *G06Q 20/32*       (2012.01)

(52) U.S. Cl.
    CPC ............ *G08B 21/182* (2013.01); *G06Q 20/204* (2013.01); *G06Q 20/327* (2013.01)

(58) Field of Classification Search
    CPC ...................................................... G08B 21/182
    USPC ................. 340/686.6, 539.1, 539.11, 539.15, 340/573.1
    See application file for complete search history.

(56) References Cited

U.S. PATENT DOCUMENTS 4,675,656 A * 6/1987 Narcisse ............ G08B 21/0227
                                                                        128/903
7,843,327 B1 * 11/2010 DiMartino ......... G08B 13/1409
                                                                        340/505

* cited by examiner

*Primary Examiner* — Jeffery Hofsass
(74) *Attorney, Agent, or Firm* — Paul W. Martin

(57) ABSTRACT

Techniques for determining movement of a device away from a preferred location which provide notification. An example method includes receiving a signal from a beacon, determining a measure of a characteristic of the signal, performing a comparison of the measure of the characteristic to a predetermined threshold which is based upon a distance from the preferred location, determining that the device has moved at least the distance from the preferred location based upon the comparison, and issuing an alert.

21 Claims, 4 Drawing Sheets

TECHNIQUES FOR DETERMINING MOVEMENT OF A DEVICE AWAY FROM A PREFERRED LOCATION

BACKGROUND

This present invention relates to peripheral security and more specifically to techniques for determining movement of a device away from a preferred location.

Devices may move or be moved a distance away from a preferred location to some other location. Movement may be due to any of a variety of reasons, innocent or otherwise. For example, a device may be moved to another location to replace a device that has failed. As another example, a device may be carelessly relocated, then forgotten, lost or misplaced. As yet another example, a device may be stolen or temporarily removed by a fraudster.

One example device is a peripheral, such as a payment peripheral. A typical payment terminal may include a magnetic stripe reader for reading credit and debit cards. The payment terminal may also include a keypad for entering personal identification numbers (PINs).

Fraudsters often attempt to modify these devices in order to capture credit numbers and PINs. In some venues, the fraudsters remove the payment terminals, alter them to include card skimmers and key loggers, and then return or deploy them in venues where proprietors and customers are unaware that the payment terminals have been altered.

Therefore, it would be desirable to provide techniques for determining movement of devices away from a preferred location, such as payment terminals.

SUMMARY

In accordance with the teachings of the present invention, techniques for determining movement of a device away from a preferred location are provided.

An example method includes receiving a signal from a beacon, determining a measure of a characteristic of the signal, performing a comparison of the measure of the characteristic to a predetermined threshold which is based upon a distance from the preferred location, determining that the device has moved at least the distance from the preferred location based upon the comparison, and issuing an alert.

In one example embodiment, the beacon is located adjacent the preferred location. The beacon communicates with wireless communication circuitry within the device. The wireless communication circuitry is also configured to communicate with additional beacons arranged to form a boundary or wireless fence. The device determines when it moves in and/or out of range of the beacons.

In another example embodiment, the beacon is located in the device. The beacon communicates with wireless communication circuitry adjacent the preferred location. Additional wireless communication circuitry is also configured to communicate with the beacon and form a boundary or wireless fence connected to one or more computers for detecting the beacon when it moves in and/or out of range.

An example method includes receiving a plurality of signals from a beacon of the device by a computer, determining measures of a characteristic of the plurality of signals by the computer, determining distances based upon the measures by the computer, determining a new location of the device based upon the distances by the computer, determining that the device has moved at least a threshold distance from the preferred location based upon the new location by the computer, and issuing an alert by the computer. The method may further include determining a direction of travel of the device from the preferred location based upon the new location by the computer.

Another example method includes receiving a first signal from a beacon of the device by first wireless communication circuitry coupled to a computer, determining a first measure of the first signal by the computer, determining a first distance from the first wireless communication circuitry based upon the first measure by the computer, determining that the device has moved away from the preferred location and at least within a first threshold distance of the first wireless communication circuitry based upon the first measure by the computer, and issuing a first alert by the computer.

This example method may further include receiving a second signal from the beacon by second wireless communication circuitry coupled to a computer, determining a second measure of the second signal by the computer, determining a second distance from the second wireless communication circuitry based upon the second measure by the computer, determining that the device has moved away from the preferred location and at least within a second threshold distance of the second wireless communication circuitry based upon the second measure by the computer, and issuing a second alert by the computer.

An example device may include a peripheral. An example peripheral may include a card reader for sending card data to a computer, a beacon for transmitting signals for locating the payment peripheral, and a processor for controlling the card reader and the beacon. The processor may activate the beacon when the card reader is disconnected from the computer. The peripheral may further include a battery for powering the beacon.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
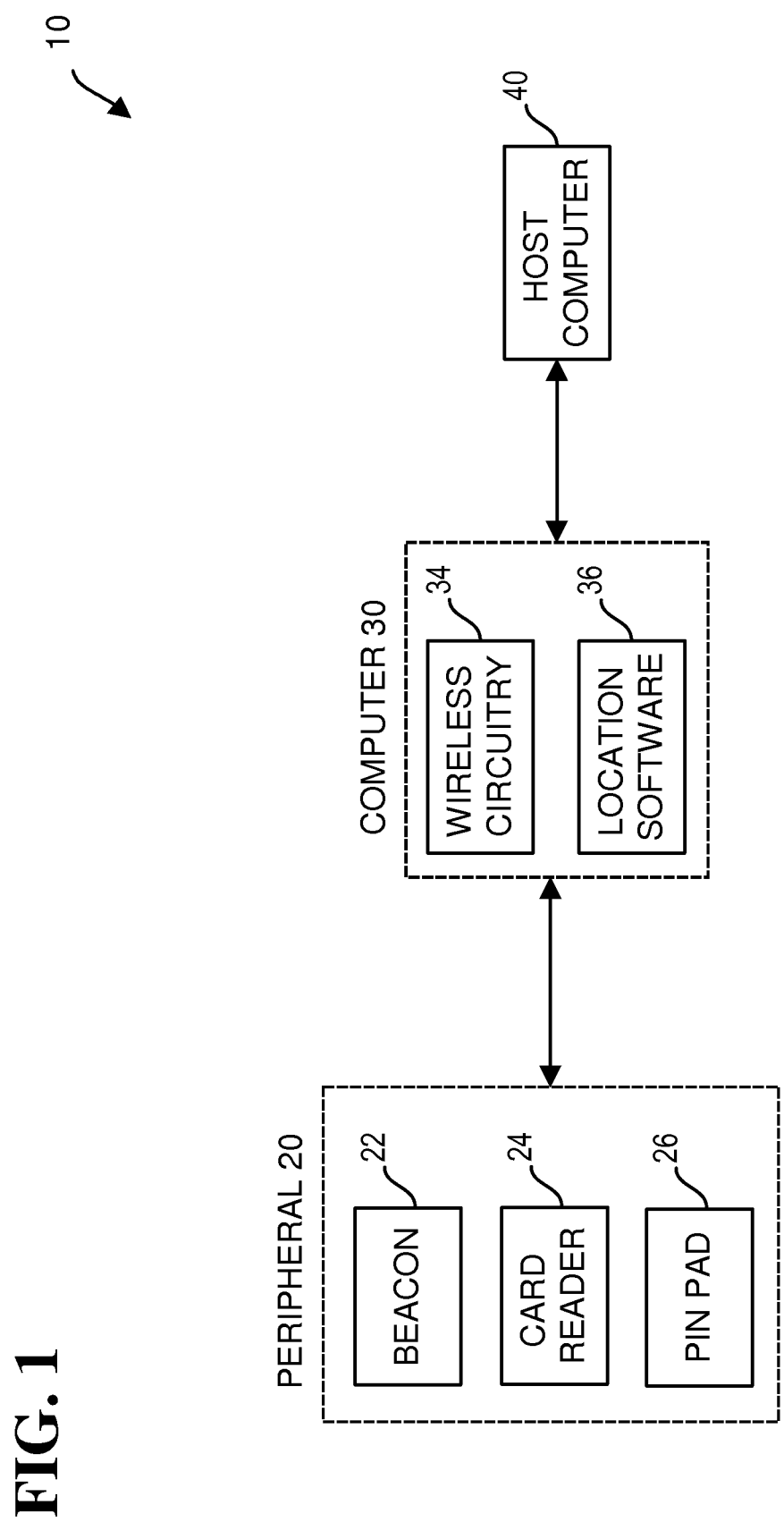
FIG. 1 is a block diagram of an example system.

With reference to FIG. 1, an example system 10 includes a peripheral 20 with a beacon 22 and a computer 30. Other example devices besides peripherals are also envisioned.

An example peripheral 20 may include a payment peripheral, such as a card reader, a personal identification number (PIN) keypad or PIN pad, a combination card reader and PIN pad, or other peripheral that is used to capture information that consumers wish to keep private or otherwise protect from fraudsters. In an example configuration, peripheral 20 includes a beacon 22, a card reader 24 for reading credit and debit cards, and a PIN pad 26. Other example peripherals besides payment peripherals are also envisioned.

Beacon 22 may include a Bluetooth Low Energy (BLE) standard beacon. Beacon 22 transmits a wireless signal, which may include a 2.4 GHz signal. Other types of wireless beacons are also envisioned. The signal may include information, such as an identifier associated with peripheral 20. No payment data is transferred by beacon 22.

Peripheral 20 may receive power from various sources. For example, peripheral 20 may receive power from a standard electrical outlet when in operational service to process payments with computer 30. Peripheral 20 also includes a battery power source for powering beacon 22 when peripheral 20 is unplugged from a standard electrical outlet and removed from operational service and away from computer 30.

Peripheral 20 may communicate with computer 30 in various ways during operational service to process payments. For example, peripheral 20 may include serial communication circuitry, such as universal serial bus (USB) circuitry for connecting to computer 30 via a USB cable. As another example, peripheral 20 may include network circuitry for connecting to computer 30 via a network.

Peripheral 20 also includes one or more processors, memory, and program and data storage. In the example configuration, peripheral 20 may include a memory for storing an encryption key. The processor executes software which is stored in a computer readable medium, such as a memory. The software encrypts captured payment information from card reader 24 and PIN pad 26 using the encryption key and sends the encrypted information to computer 30 to complete payment.

Computer 30 includes peripheral connection circuitry such as network, USB, serial RS-232, serial RS-485, or other circuitry.

Computer 30 further includes one or more processors, memory, and program and data storage. The processor executes an operating system such as a Microsoft, Linux, Apple, or other operating system. The processor may execute other computer software which stored in a computer readable medium, such as a memory.

In an example embodiment, computer 30 additionally includes wireless circuitry 34 and executes location software 36.

Wireless circuitry 34 receives signals from beacon 22 when peripheral 20 is within communication range of wireless circuitry 34.

Location software 36 determines whether peripheral 20 crosses or is within a predetermined range of computer 30 and issues an alert message when peripheral 20 crosses or is outside the predetermined range.

For example, location software 36 may obtain signal strength measurements from wireless circuitry 34. If the signal strengths of messages from beacon 22 cross or decrease below a predetermined threshold, location software 36 sends and/or displays an alert message.

In one example embodiment, the predetermined threshold is the last measured signal strength. In another example embodiment, the predetermined threshold is determined based upon distance from a preferred location of peripheral 20.

Location software 36 may also be configured to detect when peripheral 20 is returned to its preferred location or when another peripheral 20 is nearby. If the signal strengths of messages from beacon 22 cross or increase above the predetermined threshold, location software 36 sends and/or displays another alert message.

In an example configuration, computer 30 may be connected to multiple receiving stations 38 equipped with wireless circuitry 34 and be capable of monitoring signal strengths from each of the receiving stations, so as to create a security fence or boundary. For this purpose, location software 36 associated may determine whether peripheral 20 comes within a predetermined range of any of the receiving stations and issue alert messages when peripheral 20 comes within the predetermined range, and if they leave, when they go outside the predetermined range.

In another example configuration, other computers 30, may each be equipped with wireless circuitry 34 and location software 36 and be capable of monitoring signal strengths from beacon 22, as well as other beacons 22 of other devices, so as to create a security fence or boundary. For this purpose, location software 36 associated with other computers 30 may determine whether peripheral 20, as well as other devices or peripherals 20, come within a predetermined range and issue alert messages when peripheral 20 or the other devices or peripherals 20 come within the predetermined range, and if they leave, when they go outside the predetermined range.

Any or all of the multiple computers 30 may gather the beacon identifiers and signal strength measurements from other computers 30 and determine an approximate location, direction of movement, times at which signals were received from beacon 22, and times at which signal strength crossed or fell below or above the predetermined threshold. For example, location software 36 may use triangulation or other techniques to determine location. Multiple devices or peripherals 20 associated with different computers 30 and having beacons 22 may be tracked by any of computers 30.

In one example configuration, computer 30 is a retail point-of-sale (POS) computer which executes POS software for displaying transaction screens that guide an operator through a transaction involving the sale of products. Computer 30 may be coupled through a network to a host computer 40 that provides product price and other data to computer 30 during a transaction. Other types of computers 30 are also envisioned.

Host computer 40 may maintain a database or table containing records of each identifier associated with each peripheral 20 and an assigned operational location for each peripheral 20.

In addition to peripheral 20, computer 30 may be connected to other peripherals in various configurations. For example, in an assisted-service configuration operated by a store employee, computer 30 may also be connected to a touch screen, barcode reader, cash drawer, and printer.

As another example, in a self-service configuration, computer 30 may also be connected to a touch screen, barcode reader, coin and/or currency note acceptor, coin and/or bank note dispenser, one or more security devices, and a printer.

When peripheral 20 is removed from operational service and positioned away from computer 30, computer 30 may display the alert message for an operator to see, send the alert message to host computer 40 for store management to see, and/or send the alert message via email, text, or other type of message to management and/or security personnel. When peripheral 20 or another peripheral 20 is positioned near computer 30, computer 30 may display another alert message for an operator to see, send the other alert message to host computer 40 for store management to see, and/or send the other alert message via email, text, or other type of message to management and/or security personnel. The alert messages may include an identifier associated with peripherals 20 to facilitate quick identification of a particular peripheral 20 in a configuration with more than one peripheral 20 and to determine its assigned location from the database of host computer 40.

Figure 2:
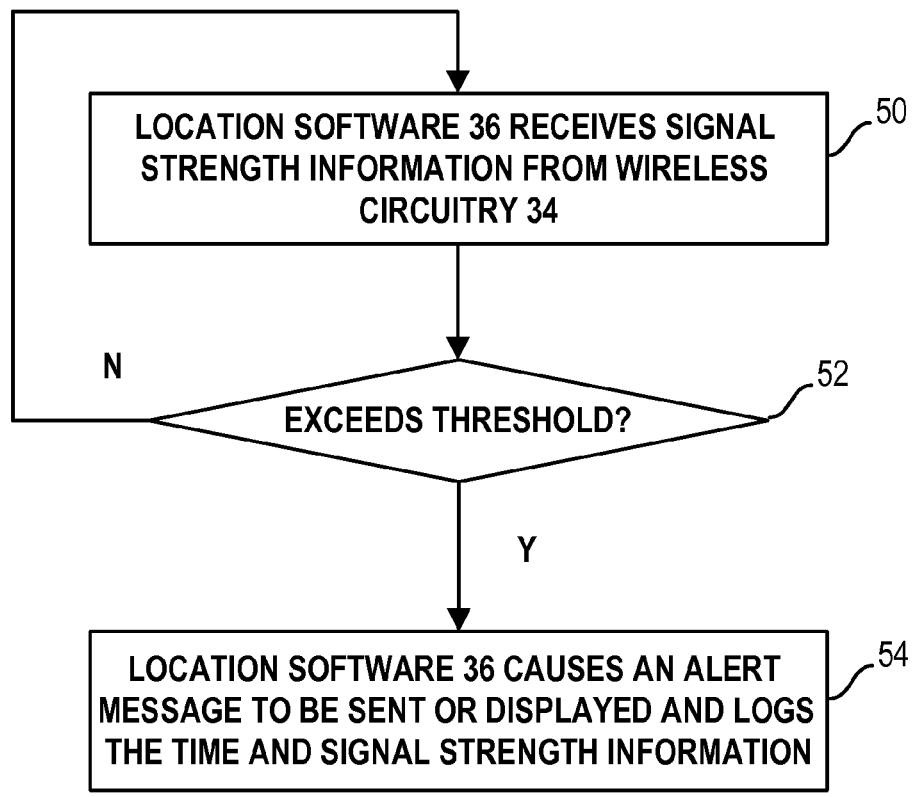
FIG. 2 illustrates an example method.

Referring now to FIG. 2, an example method is illustrated beginning with step 50, in which location software 36 receives signal strength information from wireless circuitry 34 in computer 30. Wireless circuitry 34 measures the signal strength of signals from beacon 22. Wireless circuitry 34 may also receive an identifier associated with peripheral 20 in the signals from beacon 22.

In one example method, location software 36 may continuously process signal strength information from wireless circuitry 34.

In another example method, location software 36 may periodically process signal strength information from wireless circuitry 34.

In yet another example method, location software 36 may start processing signal strength information after it determines that peripheral 20 is no longer communicating with computer 30, for example, due to a cable connecting peripheral 20 to computer 30 being disconnected. For this purpose, location software 36 may periodically or continuously check the connection status of peripheral 20. Location software 36 may additionally send and/or display an alert message when it determines that peripheral 20 has been disconnected from computer 30. Computer 30 may also stop all payment processing following a determination that peripheral 20 is disconnected.

In step 52, location software 36 compares the signal strength information to a predetermined threshold. The predetermined threshold may be determined by positioning peripheral 20 a predetermined distance from its primary operational position. For example, if the primary operational position is a particular mounting or resting point on a checkout counter, then the predetermined threshold may be determined by repositioning peripheral to a distance several feet away from the mounting point and verifying that wireless circuitry 34 senses a drop in signal strength. If wireless circuitry 34 and beacon 22 are BLE standard devices, the signal strength can be very granular and result in accurate distance measurements.

If the signal strength information is less than (or has not crossed) the predetermined threshold, operation returns to step 50. Location software 36 may log the beacon identifier, the time and the signal strength information in a log file. Otherwise, operation continues to step 54.

In step 54, location software 36 causes an alert message to be sent and/or displayed, audible or visual alarm to be activated, security cameras to be activated, and/or may log the beacon identifier, the time, and the signal strength information in a log file. Location software 36 may also determine the assigned location of peripheral 20 from host computer 40 and add the assigned location to the log. Computer 30 may stop all payment processing following receipt of the alert.

Location software 36 may optionally wait a predetermined time period for peripheral 20 to return to its assigned location before taking alert actions.

In an example configuration containing more than one peripheral 20 monitored by computer 30, operation may return to step 50 to continue monitoring the status of the other peripherals 20. For example, if the signal strengths of messages from beacons 22 cross or increase or decrease relative to the predetermined threshold, location software 36 sends and/or displays additional alert messages. In this way, computer 30 tracks movement towards, away from and/or past computer 30.

In an example configuration including multiple computers 30 with wireless circuitry 34 and location software 36, each computer 30 may perform the method each time it receives a signal from beacon 22.

Figure 3:
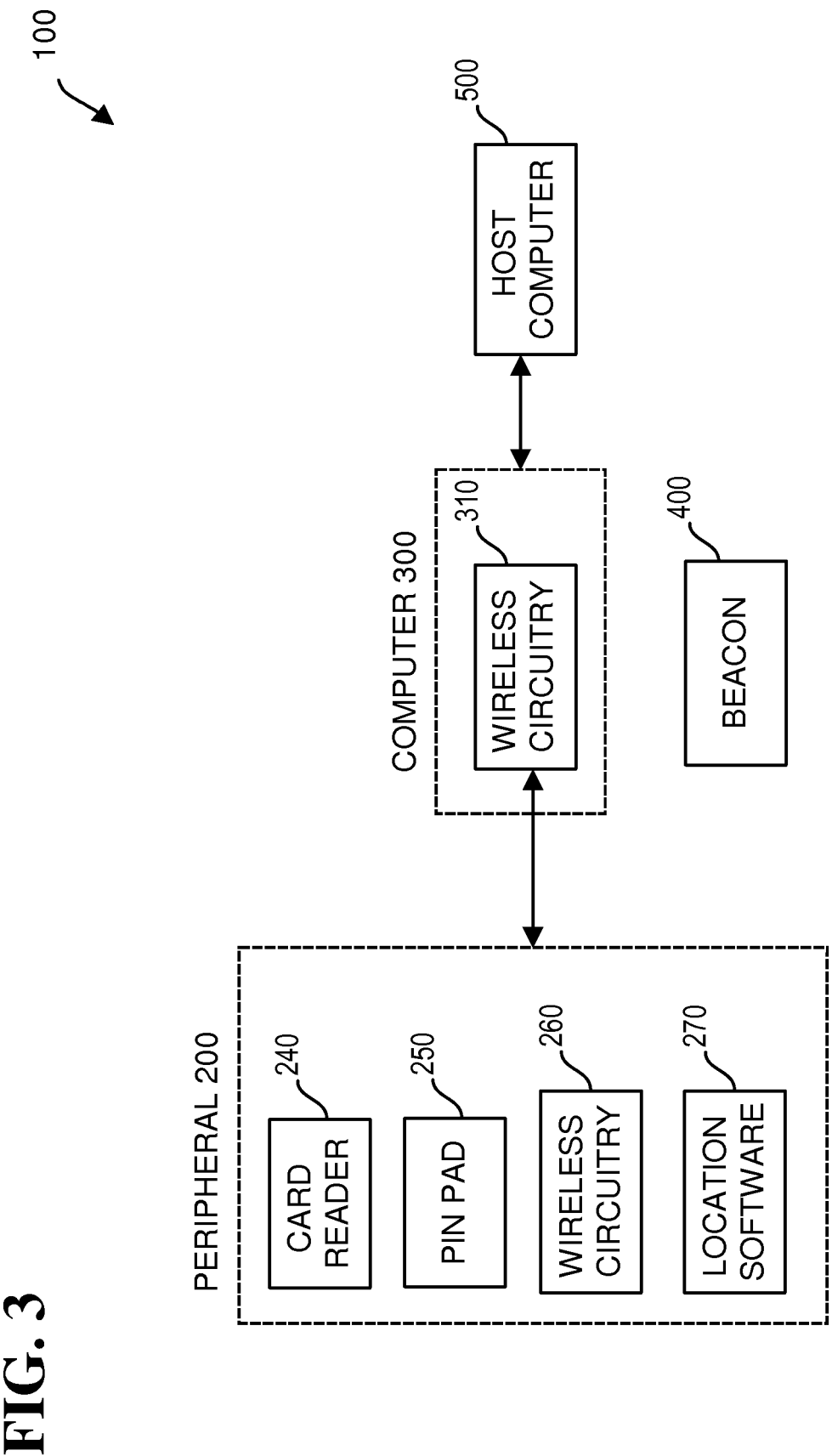
FIG. 3 is a block diagram of another example system.

With reference to FIG. 3, another example system 100 includes a peripheral 200, a computer 300, and a beacon 400. Other example devices besides peripherals are also envisioned.

In this example, peripheral 200 determines its location relative to beacon 400. In one example configuration, beacon 400 is located in close proximity to computer 300. Another example configuration includes more than one beacon 400, so as to create a security fence. In another example configuration, each beacon 400 has a collocated computer 300.

Beacon 400 may include a BLE standard low energy beacon. Beacon 400 transmits a wireless signal, which may include a 2.4 GHz signal. Other types of wireless beacons are also envisioned. The signal may include information, such as an identifier associated with beacon 400.

Peripheral 200 may include a payment peripheral, such as a card reader, a personal identification number (PIN) keypad or PIN pad, a combination card reader and PIN pad, or other peripheral that is used to capture information that consumers wish to keep private or otherwise protect from fraudsters. In an example configuration, peripheral 200 includes card reader 240 for reading credit and debit cards and PIN pad 250. Other example peripherals besides payment peripherals are also envisioned.

Peripheral 200 may communicate with computer 300 in various ways during operational service to process payments. For example, peripheral 200 may include serial communication circuitry, such as universal serial bus (USB) circuitry for connecting to computer 300 via a USB cable. As another example, peripheral 200 may include network circuitry for connecting to computer 300 via a network.

Peripheral 200 also includes one or more processors, memory, and program and data storage. In the example configuration, peripheral 200 may include a memory for storing an encryption key. The processor executes software which is stored in a computer readable medium, such as a memory. The software encrypts captured payment information from card reader 240 and PIN pad 250 using the encryption key and sends the encrypted information to computer 300 to complete payment.

In an example embodiment, peripheral 200 additionally includes wireless circuitry 260 and executes location software 270. Wireless circuitry 260 receives signals from beacon 400 when peripheral 200 is within communication range of beacon 400.

Location software 270 determines whether peripheral 200 crosses or is within a predetermined range of beacon 400 and issues an alert message when peripheral 200 crosses or is outside the predetermined range.

For example, location software 270 may obtain signal strength measurements from wireless circuitry 260. If the signal strengths of messages from beacon 400 cross or decrease below a predetermined threshold, location software 270 sends an alert message, for example, through wireless circuitry 260. No payment data is sent by peripheral 200.

In an example configuration including more than one beacon 400, wireless circuitry 260 and location software 270 are capable of monitoring signal strengths from such beacons 400 and determining an approximate location and direction of movement of peripheral 200. As part of the alert messages, peripheral 200 may send the beacon identifier, the times at which signals were received, and times at which signal strengths crossed or fell below the predetermined threshold. For example, location software 270 may use triangulation or other techniques to determine location.

Peripheral 200 may receive power from various sources. For example, peripheral 200 may receive power from a standard electrical outlet when in operational service to process payments with computer 300. Peripheral 200 also includes a battery power source for powering peripheral 200 when peripheral 200 is unplugged from a standard electrical outlet and removed from operational service and away from computer 300, so that peripheral 200 can process signal strengths and send alert messages to computer 300.

Computer 300 includes one or more processors, memory, and program and data storage. The processor executes an operating system such as a Microsoft, Linux, Apple, or other operating system. The processor may execute other computer software which stored in a computer readable medium, such as a memory. Computer 300 further includes peripheral connection circuitry such network, USB, serial RS-232, serial RS-485, or other circuitry for connecting peripherals, including peripheral 200. In one example configuration, computer 300 is a retail point-of-sale (POS) computer terminal which executes POS software for displaying transaction screens that guide an operator through a transaction. Computer 300 may be coupled through a network to a host computer 500 that provides product price and other data to computer 300 during a transaction.

Host computer 500 may additionally maintain a database or table containing records of each identifier associated with each peripheral 20 and an assigned operational location for each peripheral 20.

In order to receive alert messages from peripheral 200, computer 300 includes wireless circuitry 310. In one example configuration, wireless circuitry 310 receives the alert messages from wireless circuitry 260 in peripheral 200. Wireless circuitry 310 may include BLE circuitry.

Figure 4:
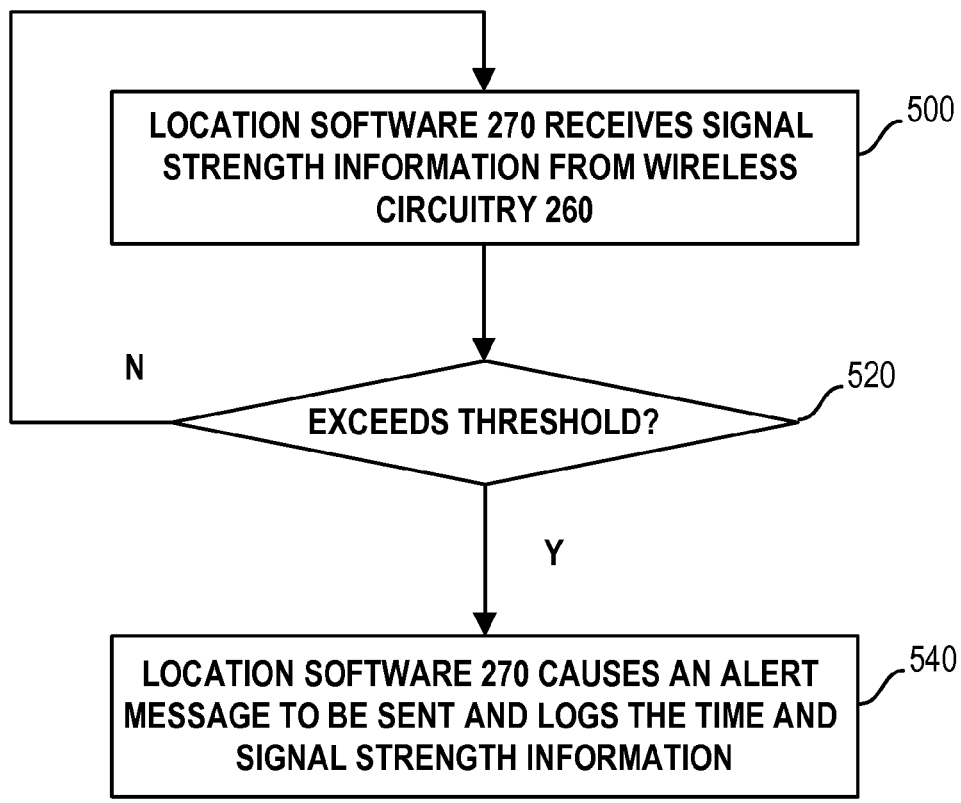
FIG. 4 illustrates another example method.

Referring now to FIG. 4, an example method is illustrated beginning with step 600, in which location software 260 receives signal strength information from wireless circuitry 260 in peripheral 200. Wireless circuitry 260 measures the signal strength of signals from beacon 400. Wireless circuitry 260 may also receive an identifier in the signals from beacon 400. If wireless circuitry 260 and beacon 400 are BLE standard devices, the signal strength can be very granular and result in accurate distance measurements.

In one example method, location software 270 may continuously process signal strength information from wireless circuitry 260.

In another example method, location software 270 may periodically process signal strength information from wireless circuitry 260.

In yet another example method, location software 270 may start processing signal strength information after it determines that peripheral 200 is no longer communicating with computer 300, for example, due to a cable connecting peripheral 200 to computer 300 being disconnected. For this purpose, location software 270 may periodically or continuously check the connection status of peripheral 200. Location software 270 may additionally send and/or display an alert message when it determines that peripheral 200 has been disconnected from computer 300. Location software 270 may also disable payment functions, e.g., without receipt of proper authorization code, following disconnect.

In step 620, location software 270 compares the signal strength information to a predetermined threshold. The predetermined threshold may be determined by positioning peripheral 200 a predetermined distance from its primary operational position.

If the signal strength information crosses or is less than the predetermined threshold, operation returns to step 600. Location software 270 may send the beacon identifier, the time, and the signal strength information to computer 300. Otherwise, operation continues to step 640.

If the signal strengths of messages from any of beacons 400 cross or increase the predetermined threshold, location software 270 sends and/or displays additional alert messages. In this way, location software 270 tracks movement towards, away from and/or any of beacons 400.

In step 640, location software 270 causes an alert message to be sent to computer 300. Location software 270 may also activate an audible alarm within peripheral 200. Location software 270 may send the beacon identifier, the time, and the signal strength information to computer 300 with the alert message. Location software 270 may disable payment functions, e.g., without receipt of proper authorization code, when it sends an alert message.

In response to the alert message, computer 300 may activate an, audible or visual alarm, activate security cameras, and/or log the beacon identifier, the time, and the signal strength information in a log file.

Location software 270 may optionally wait a predetermined time period for peripheral 200 to return to its assigned location before sending the alert message.

In an example configuration including multiple beacons 400, location software 270 may perform the method each time it receives a signal from beacon 400.

In response to an alert message, any of computer 300 or host computer 500 may store the beacon identifier, the time, and the signal strength information in a log file. Any of computer 300 or host computer 500 may also determine the assigned location of peripheral 200 from host computer 500 and add the assigned location to the log.

The techniques disclosed herein offer built in theft security for peripherals without constraining the peripherals to be mechanically constrained by cables and locks. Unlike physical security techniques, the techniques herein provide notification of theft.

Although the present invention has been described with particular reference to certain preferred embodiments thereof, variations and modifications of the present invention can be effected within the spirit and scope of the following claims.

What is claimed is:

1. A method of determining movement of a peripheral device of a computer away from a preferred location comprising:
receiving a signal from a beacon of the peripheral device of the computer by the computer;
determining a measure of a characteristic of the signal by the computer;
performing a comparison of the measure of the characteristic to a predetermined threshold which is based upon a distance from the preferred location by the computer;
determining that the peripheral device has moved at least the distance from the preferred location based upon the comparison by the computer.

2. The method of claim 1, further comprising issuing an alert.

3. The method of claim 1, wherein issuing an alert comprises issuing an alert after a predetermined time.

4. The method of claim 2, wherein issuing an alert comprises sending an alert message.

5. The method of claim 2, wherein issuing an alert comprises activating an audible alarm.

6. The method of claim 2, wherein issuing an alert comprises activating a visual alarm.

7. The method of claim 2, wherein issuing an alert comprises activating a security camera.

8. The method of claim 1, further comprising entering the measure of the characteristic, a date and time, and an identifier associated with the beacon in a log file.

9. The method of claim 1, wherein the measure of the characteristic of the signal comprises signal strength.

10. The method of claim 1, further comprising disabling a preferred function of the device.

11. The method of claim 1, wherein the beacon comprises a Bluetooth Low Energy standard beacon.

12. The method of claim 1, further comprising:
receiving another signal from the beacon;
determining another measure of the characteristic of the signal;
performing another comparison of the other measure of the characteristic to the predetermined threshold;
determining that the device has moved within the distance from the preferred location based upon the other comparison.

13. The method of claim 1, wherein the beacon is in the device.

14. The method of claim 13, performed by a computer monitoring locations of the device.

15. The method of claim 14, further comprising:
receiving another signal from the beacon by another computer;
determining another measure of the characteristic of the signal by the other computer;
performing another comparison of the other measure of the characteristic to the predetermined threshold by the other computer;
determining that the device has moved within the distance of the other computer based upon the other comparison.

16. The method of claim 1, wherein the beacon is adjacent the preferred location.

17. The method of claim 16, performed by the device.

18. The method of claim 17, further comprising:
receiving another signal from another beacon at another location;
determining another measure of the characteristic of the other signal by the device;
performing another comparison of the other measure of the characteristic to the predetermined threshold by the device;
determining that the device has moved within the distance of the other beacon based upon the other comparison.

19. The method of claim 1, wherein the device comprises a payment peripheral.

20. A method of determining movement of a peripheral device of a computer away from a preferred location comprising:
receiving a first signal from a beacon of the peripheral device of the computer by first wireless communication circuitry coupled to the computer;
determining a first measure of the first signal by the computer;
determining a first distance from the first wireless communication circuitry based upon the first measure by the computer;
determining that the peripheral device has moved away from the preferred location and at least within a first threshold distance of the first wireless communication circuitry based upon the first measure by the computer; and
issuing a first alert by the computer in response to movement of the peripheral device away from the preferred location and at least within a first threshold distance of the first wireless communication circuitry.

21. The method of claim 20, further comprising:
receiving a second signal from the beacon by second wireless communication circuitry coupled to a computer;
determining a second measure of the second signal by the computer;
determining a second distance from the second wireless communication circuitry based upon the second measure by the computer;
determining that the device has moved away from the preferred location and at least within a second threshold distance of the second wireless communication circuitry based upon the second measure by the computer; and
issuing a second alert by the computer.

* * * * *